United States Patent Office.

JACQUES LOUIS KESSLER, OF CLERMONT FERRAUD, FRANCE.

PROCESS OF TREATING NATURAL AND ARTIFICIAL STONE.

SPECIFICATION forming part of Letters Patent No. 308,263, dated November 18, 1884.

Application filed June 11, 1883. (No specimens.) Patented in Belgium November 3, 1882, No. 59,455; in France November 6, 1882, No. 151,928; in Italy February 27, 1883, No. 15,194; in Germany June 5, 1883, No. 27,083; in England October 17, 1883, No. 4,954, and in Austria January 11, 1884, No. 34,683.

*To all whom it may concern:*

Be it known that I, JACQUES LOUIS KESSLER, a citizen of the Republic of France, and a resident of Clermont Ferraud, France, have invented an Improved Process of Treating Natural and Artificial Stone, &c., (for which I have obtained British Patent No. 4,954, October 17, 1883; French Patent No. 151,928, November 6, 1882; Belgian Patent No. 59,455, November 3, 1882; Austrian Patent No. 34,683, January 11, 1884; German Patent No. 27,083, June 5, 1883, and Italian Patent No. 15,194, February 27, 1883,) of which the following is a specification.

My invention consists of certain improvements in the treatment of natural and artificial stones, plasters, stuccoes, &c., by impregnating them with chemicals for the purpose of coloring, hardening, polishing, and waterproofing them, as more fully described hereinafter.

The substance to be treated may be natural stone, or artificial stone, or stuccoes, or molded plasters made with hydraulic or other cement, or may be clay, or china clay, or similar mineral substances.

My invention consists, essentially, in treating these substances with the derivatives of fluorine to harden them, together with an encaustic, oily, or waterproofing substance—such as wax, stearine, or paraffine—to give a waterproof or enameled surface. The fluorine derivatives used for hardening the substances may be in various forms. For instance, in treating colored stones, or stuccoes, or for coloring stuccoes, I impregnate them with fluo-silicates of iron or the fluo-silicates of manganese, or the fluoride or the fluo-silicate of chromium, cobalt, nickel, or other metals. The impregnation with these chemical agents may be carried out in two operations by treating them first with fluo-silicates of lead or mercury, for instance, and afterward with an iodide or chromate. The fluorides leave in the chalky matters only fluor-spar and their oxides. The fluo-silicates leave silica as well. The fluor-hydrate of ammonia leaves only fluoride of calcium, for it is freed from the carbonate of ammonia.

By treating the stone, stucco, plaster, or other desired substances with the chemical agents named they may be readily waterproofed or hardened or colored. A stucco or a molded plaster made with hydraulic or ordinary lime, cement, or plaster mixed with lime, or even with clay, will become quite hard in the desired ornamental shape after impregnation, as described.

Clay or china clay will become hard as stone when made into a paste with fluo-silicic acid (hydro-fluosilicic) of 40° Baumé, and will serve for lutings or mastics in the arts, especially where acid substances are to be used. This paste can also be molded or turned like clay, and may be formed into vessels or utensils and other articles without danger of their breaking.

Besides the derivatives of fluorine just named, I may use as chemical agents also certain phosphates (insoluble by themselves) after having dissolved them in acids, which become insoluble in contact with stone. Such, for instance, are the earthy or metallic phosphates dissolved in hydro-fluosilicic acid or in fluor-hydric acid.

The various articles above referred to may be impregnated with the chemical agents while in a more or less loosely-combined state, and in one operation or in several operations, as may be found desirable, and with or without drying. The impregnation also may precede or follow the treatment of the articles with other agents. For instance, after having hardened the substance to an alkaline silicate, if it be caused to absorb fluo-silicate or fluoride of aluminum, the soda or the potash is thereby rendered completely insoluble in the state of or similar to cryolite, and nothing soluble remains in the material.

If the acid employed is hydro-fluosilicic acid or fluor-hydric acid combined with alumina, it forms an insoluble alkaline silico-aluminate and a cryolite equally insoluble. When the excess of fluoride or of fluosilicate is transformed by the calcareous matters into products also insoluble, the same end is attained.

The reactions may vary with the various chemical agents above named, and may give in a number of cases products quite insoluble; but it is not necessary to cite them all.

To impart the water-proof, polished, and enameled quality to the stone, I treat it with wax, stearine, or paraffine, or similar encaustic, oily, or waterproofing composition, which may be mixed with the agents before referred to in either a dry or melted form or in solution.

I claim as my invention—

The mode herein described of treating stone, plaster, stucco, and similar substances, said mode consisting in impregnating said substances with the derivatives of fluorine and wax or equivalent material, substantially as set forth.

In testimony whereof I have signed my name to this specification in the presence of two subscribing witnesses.

JACQUES LOUIS KESSLER.

Witnesses:
ALFRED COINY,
EDWARD P. MACLEAN.